Nov. 6, 1956 J. M. CLUWEN 2,769,870

TRANSISTOR AMPLIFIER CIRCUIT

Filed Aug. 19, 1950

INVENTOR.
JOHANNES MEYER CLUWEN
BY Fred M. Vogel
AGENT

United States Patent Office 2,769,870

Patented Nov. 6, 1956

2,769,870

TRANSISTOR AMPLIFIER CIRCUIT

Johannes Meyer Cluwen, Eindhoven, Netherlands, assignor to Hartford National Bank and Trust Company, Hartford, Conn., as trustee Application August 19, 1950, Serial No. 180,390

Claims priority, application Netherlands August 30, 1949

1 Claim. (Cl. 179—171)

This invention relates to an electrical amplifying circuit-arrangement employing a transistor.

The term "transistor" as employed herein refers to an amplifying element comprising a crystal having a base electrode, an emitter or input electrode and a collector or output electrode. The voltage to be amplified is supplied to the input electrode which has, for example, a low positive bias potential relative to the base electrode, the amplified voltage being derived from the output electrode which is maintained at, for example, a high negative bias potential relative to the base electrode.

The object of this invention is to adjust the input impedance of such an amplifier to a desired value, for example to match the said input impedance to the impedance of a telephone line through which the voltage to be amplified is supplied to the amplifier.

According to the invention an impedance $R_u$ is provided in the output circuit of the transistor which is equal to the formulae $R_u=b(R_{21}-R_{22})$ in which $$R_{21}=\frac{e_2}{i_1} \text{ when } i_2=0 \text{ and } R_{22}=\frac{e_2}{i_2} \text{ when } i_1=0$$

($e_2$ is the variation in voltage between the output electrode and the base electrode of the transistor, $i_1$ is the variation in input current, $i_2$ is the variation in output current and $b$ is a constant between 0.5 and 1.2) and an impedance $R_o$ is included in the circuit of the base electrode of the transistor.

Figure 1:
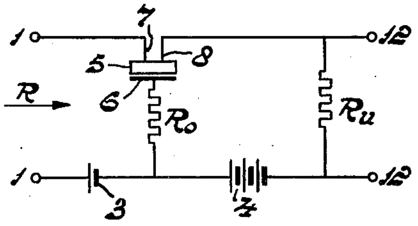
Figure 2:
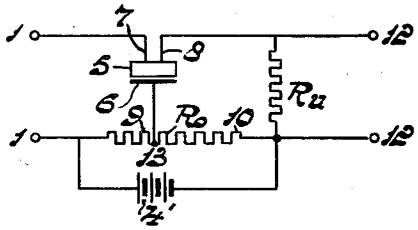

The invention will now be described with reference to the accompanying drawing in which:

Fig. 1 shows one amplifier circuit arrangement employing a transistor according to the invention; and Fig. 2 shows another embodiment of the amplifying circuit according to the invention employing a transistor.

In Figs. 1 and 2 the voltage or current to be amplified is supplied to input terminals 1—1 of a transistor 5 having a base electrode 6, an input or emitter electrode 7 and a collector or output electrode 8. The amplified voltage is generated through an output impedance $R_u$ and supplied to output terminals 12 which are not connected to impedances which materially affect the output impedance of the circuit, i. e., the impedance $R_u$ dominates the output circuit. In the case of an N-type transistor the input voltage shown in Fig. 1, is maintained at a small positive value by means of a battery 3, whereas the output voltage is maintained at a high negative value, for example, by means of a battery 4 (Fig. 1) and 4' (Fig. 2). In the case of a P-type transistor, however, the input voltage is required to be maintained at a small negative value and the output voltage at a high positive value.

According to the invention, the output impedance $R_u$ is given a predetermined value, a base impedance $R_o$ being included in the circuit of the base electrode and having a value at which the input impedance of the circuit matches the impedance of the source of signal voltage or current to be amplified.

In accordance with the conventional amplifying technique it would be expected that the base impedance $R_o$ would result in a large negative feedback for the voltage or current to be amplified and hence an increase in input impedance. It has been found, however, that such is not the case with the said choice of the output impedance $R_u$, as will appear from the following considerations.

With a given adjustment of direct current, the relationship between the voltage variations $e_1$, $e_2$ and the current variations $i_1$, $i_2$ at the input electrode 7 and the output electrode 8, respectively, with respect to the base electrode 6 may be represented for a transistor by the following relationships:

$$e_1=R_{11}i_1+R_{12}i_2 \quad (1)$$
$$e_2=R_{21}i_1+R_{22}i_2 \quad (2)$$

in which the R values are determined by the transistor properties and are measured under certain, specified conditions. However, considering the voltage variations with respect to the bottom of the impedance $R_o$, we find the following relationships:

$$e_1=(R_{11}+R_o)i_1+(R_{12}+R_o)i_2 \quad (3)$$
$$e_2=(R_{21}+R_o)i_1+(R_{22}+R_o)i_2 \quad (4)$$

Furthermore, the equation $e_2=-i_2R_u$ applies so that the following output voltage is found:

$$e_2=\frac{(R_{21}+R)R_{ou}}{a+xR_o}e_1 \quad (5)$$

in which $a=R_uR_{11}+(R_{11}R_{22}-R_{12}R_{21})+R_o(R_{11}-R_{12})$ and $x=R_u-R_{21}+R_{22}$.

Furthermore, the input impedance R measured between the input terminals 1—1 is found to be:

$$R=\frac{a+xR_o}{R_u+R_{22}+R_o} \quad (6)$$

With a transistor, the expression $R_{11}R_{22}-R_{12}R_{21}$ is found to assume a low positive value or, in certain cases, a negative value. Furthermore, the expression $R_{11}-R_{12}$ is always small and positive. Thus, the value $a$ is normally comparatively small, since $R_{11}$ also has a small value.

However, $R_{21}$ has a high value and the expression $R_{21}-R_{22}$ can also assume a considerable positive value.

Without the base impedance $R_o$, the input impedance of the transistor is $$R=\frac{a}{R_u+R_{22}} \quad (7)$$

By providing, according to the invention, that the quantity $x$ has a small positive or negative value, exact adjustment of the input impedance may be ensured with the use of the impedance $R_o$. For this purpose the value of the output impedance is chosen to be $$R_u=b(R_{21}-R_{22}) \quad (8)$$

in which $b$ is a figure which most advantageously lies between 0.5 and 1.2.

If the quantity $x$ is chosen to be approximately zero ($b=1$), we find for the relation between the input energy and the energy absorbed by the output impedance $R_u$:

$$\frac{e_2^2/R}{e_1^2/R}=\frac{(R_{21}+R_o)(R_{21}-R_{22})}{a+xR_o} \quad (9)$$

so that despite the impedance $R_o$ a considerable amplification of energy is obtained.

If the value of $x$ is chosen to be such that $$x=\frac{a}{R_{21}}, \text{ that is, } R_u=\frac{a}{R_{21}}+R_{21}-R_{22}$$

the energy relation is found to become equal to $$\frac{R_{21}(R_{21}-R_{22})}{a} \quad (10)$$

and hence also independent of the value of $R_o$, so that the input impedance may then be controlled without the energy amplification being varied.

In Fig. 2, the base impedance $R_o$ is so arranged that the bias potentials required for adjusting the transistor are obtained at the same time with only one battery 4', the effective impedance $R_o'$ which is active to the signal frequencies being the parallel combination of the parts of the impedance which are then electrically conducting, for example, the parallel combination of resistances 9 and 10, since the battery 4' has a low internal resistance and acts substantially as a short circuit to signal frequencies. It is evident that, if desired, an additional conducting impedance (not shown) may be provided between the junction 13 of the impedances 9, 10 and the base electrode 6.

While the invention has been described with specific embodiments thereof, other variations and modifications of which it is susceptible will be readily apparent to those skilled in the art without departing from the spirit and scope of the invention.

What I claim is:

An amplifying circuit arrangement comprising a transistor element having a base electrode, an emitter electrode, and a collector electrode, a source of signal potential having a given impedance, an input circuit of said transistor connected between said base electrode and said emitter electrode, said input circuit being connected to said source, an output circuit connected between said collector and said base electrode, said output circuit having an output impedance including a dominant element $R_u$ having a value which is equal to $b(R_{21}-R_{22})$ in which $$R_{21}=\frac{e_2}{i_1}$$

when $i_2=0$ and $$R_{22}=\frac{e_2}{i_2}$$

when $i_1=0$, $e_2$ being the variation in voltage between the collector and the base electrode, $i_1$ being the variation in current of the input circuit, $i_2$ being the variation in current in the output circuit, and $b$ being a constant having a value between 0.5 and 1.2, a base impedance $R_o$ having two series-connected portions connected at their junction to said base electrode and being common to both the input and output circuits, said base impedance having a value at which the input impedance of said arrangement matches the impedance of said source, and a single source of potential for said transistor connected in parallel with said entire base impedance.

References Cited in the file of this patent

UNITED STATES PATENTS

| | | |
|---|---|---|
| 2,533,001 | Eberhard | Dec. 5, 1950 |
| 2,541,322 | Barney | Feb. 13, 1951 |
| 2,647,958 | Barney | Aug. 4, 1953 |